United States Patent
Crouch et al.

(10) Patent No.: US 6,970,080 B1
(45) Date of Patent: Nov. 29, 2005

(54) COMPUTER SHUT DOWN SYSTEM

(76) Inventors: Shawn D. Crouch, Rte. 3, Box 3132, Lincoln, MO (US) 65338; Melissa L. Crouch, Rte. 3, Box 3132, Lincoln, MO (US) 65338

( * ) Notice: Subject to any disclaimer, the term of this patent is extended or adjusted under 35 U.S.C. 154(b) by 147 days.

(21) Appl. No.: 10/748,797

(22) Filed: Dec. 31, 2003

(51) Int. Cl.[7] .................................................. G08B 1/08
(52) U.S. Cl. ........................ 340/539.26; 340/539.1; 340/500; 340/540; 340/665; 340/666; 340/667; 713/300; 713/323; 713/324
(58) Field of Search ........................ 340/539.26, 539.1, 340/539.19, 573.1, 573.4, 540, 541, 500, 340/665, 666, 667; 713/300, 323, 324

(56) References Cited

U.S. PATENT DOCUMENTS

| | | | |
|---|---|---|---|
| 5,396,443 A | 3/1995 | Mese et al. | |
| 5,548,764 A | 8/1996 | Duley et al. | |
| 5,822,598 A | 10/1998 | Lam | |
| 6,282,655 B1 * | 8/2001 | Given | 713/200 |
| 6,325,414 B2 | 12/2001 | Breed et al. | |
| 6,418,536 B1 | 7/2002 | Park | |
| 6,463,542 B1 | 10/2002 | Yu et al. | |
| 6,875,932 B2 * | 4/2005 | Tuft | 177/25.13 |

* cited by examiner

Primary Examiner—Hung Nguyen

(57) ABSTRACT

A computer shut down system includes a sitting detection assembly that is mounted in a seat cushion. The sitting detection assembly includes a pressure indicator for detecting when a weight is positioned on the seat cushion. A transmitter is operationally coupled to the pressure indicator. The transmitter is adapted for sending a wireless signal when the pressure indicator detects the weight. A receiver for receiving the wireless signal is electrically coupled to the computer processor such that the receiver may relay the wireless signal to the computer processor. The computer processor may selectively power down or power up the computer system upon reception of the wireless signal sent by the transmitter.

3 Claims, 3 Drawing Sheets

COMPUTER SHUT DOWN SYSTEM

BACKGROUND OF THE INVENTION

1. Field of the Invention

The present invention relates to computer protection and shut down devices and more particularly pertains to a new computer protection and shut down device for providing input to a computer processor for powering down a computer system after a user leaves the computer system.

2. Description of the Prior Art

The use of computer protection and shut down devices is known in the prior art. While these devices fulfill their respective, particular objectives and requirements, the need remains for a device that detects the presence of a computer user and provides an input signal to the computer if the user moves away from the computer system. Upon receiving of the input signal, the computer determines if the computer should be placed in power save mode and if security measures should be activated.

SUMMARY OF THE INVENTION

The present invention meets the needs presented above by providing a pressure indicator to determine if a person is sitting on a seat cushion. The seat cushion would be part of the computer chair of the person. A signal would be transmitted from the pressure indicator to the person's computer so that the computer would have information regarding the person's position at their computer chair. When the person stands up, the pressure indicator would send a signal so that the computer would then have input regarding the person's absence. The computer would then initiate power save mode and would bring up any security measures programmed on the computer. When the person again sits on the computer chair, the computer would power up, but the security measures could then be used to ensure that the proper person is sitting at the desk. Thus, the present invention may be used as a power saving feature and can also be used for security purposes to hide critical information should the person leave the computer.

Another object of the present invention is to provide a new computer protection and shut down device that also includes a motion detector that, though it could be used without the pressure indicated, is may used in conjunction with the pressure indicator to indicate movement about the office of the person to prevent premature power saving.

To this end, the present invention generally comprises a sitting detection assembly that is mounted in a seat cushion. The sitting detection assembly includes a pressure indicator for detecting when a weight is positioned on the seat cushion. A transmitter is operationally coupled to the pressure indicator. The transmitter is adapted for sending a wireless signal when the pressure indicator detects the weight. A receiver for receiving the wireless signal is electrically coupled to the computer processor such that the receiver may relay the wireless signal to the computer processor. The computer processor may selectively power down or power up the computer system upon reception of the wireless signal sent by the transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
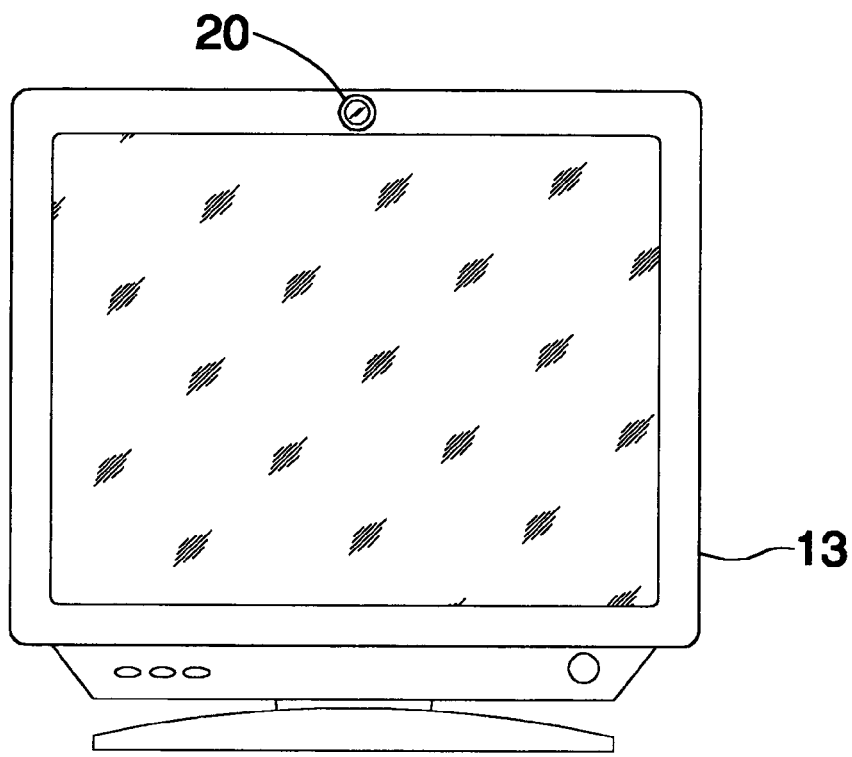
FIG. 1 is a front view of a monitor and motion sensor of a computer shut down system according to the present invention.
Figure 2:
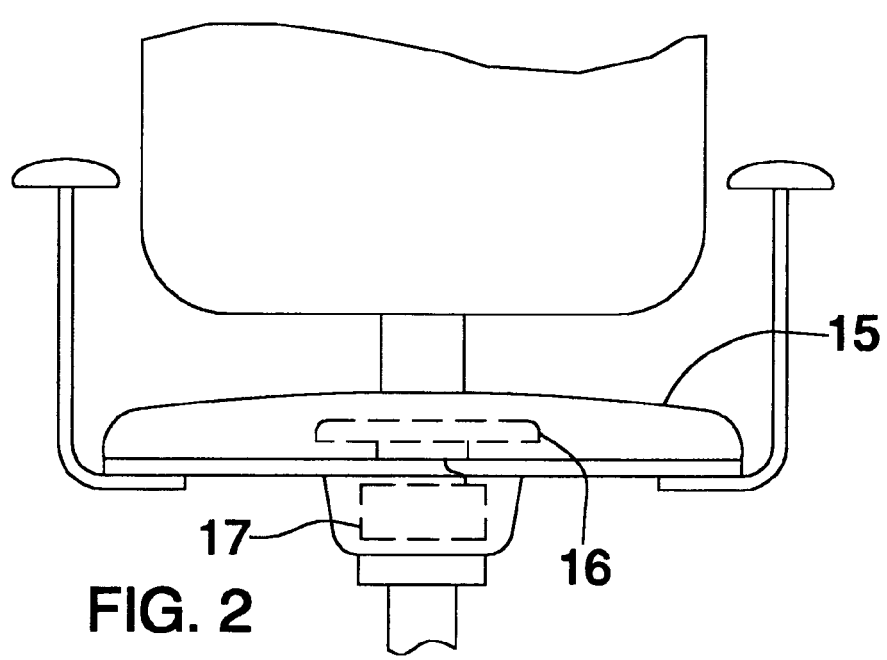
FIG. 2 is a front view of a computer chair cushion of the present invention.
Figure 3:
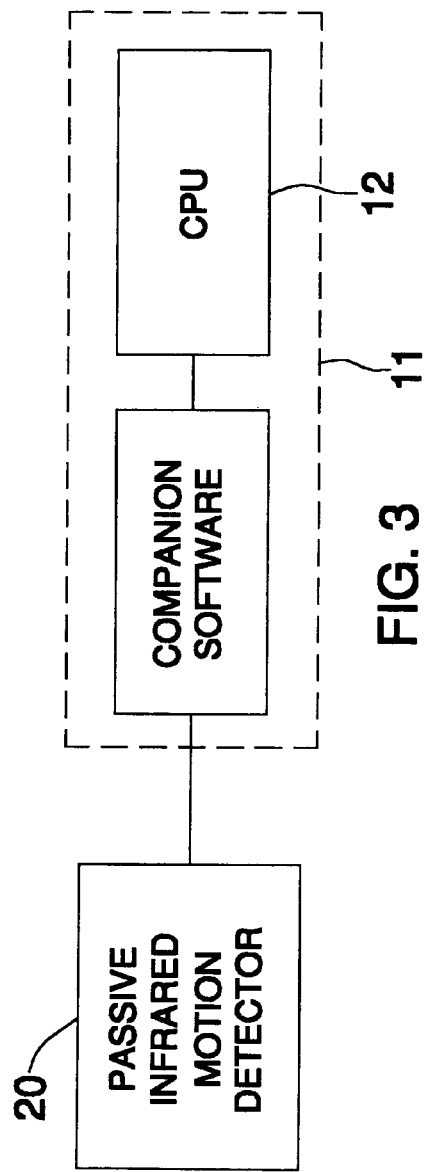
FIG. 3 is a schematic view of the present invention.
Figure 4:
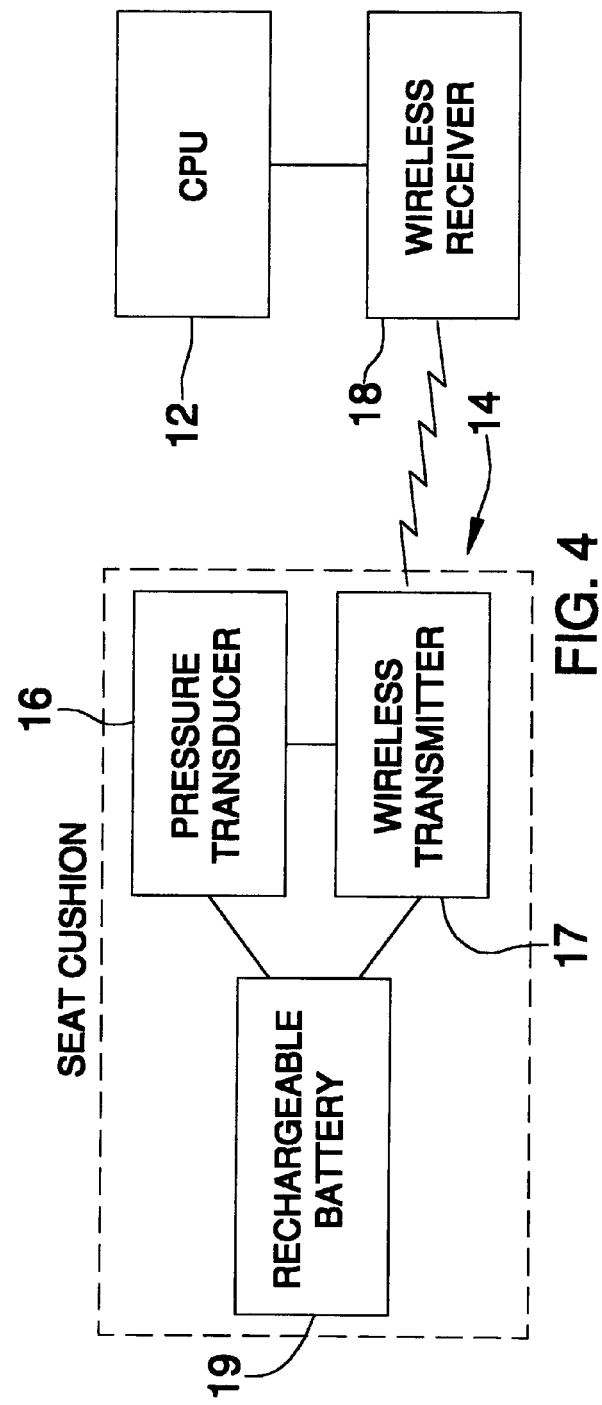
FIG. 4 is a schematic view of the present invention.
Figure 5:
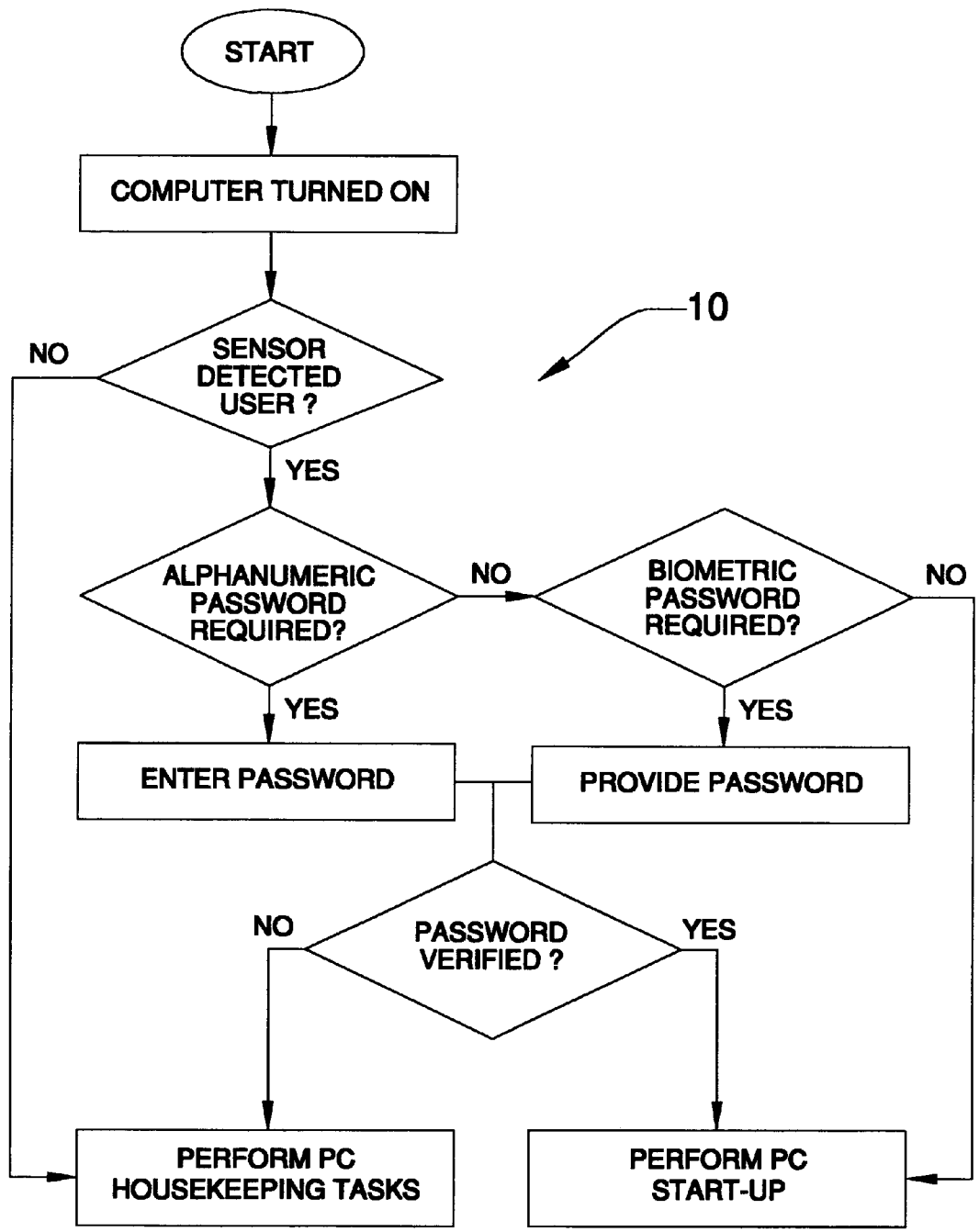
FIG. 5 is a schematic view of the present invention.

With reference now to the drawings, and in particular to FIGS. 1 through 5 thereof, a new computer protection and shut down device embodying the principles and concepts of the present invention and generally designated by the reference numeral 10 will be described.

As best illustrated in FIGS. 1 through 5, the computer shut down system 10 generally comprises an input system for detecting the presence of a user and sending a signal to a computer processor 12 of a computer system 11 to selectively power down or power up the computer system 11. Powering down, or shutting down, may be synonymous with the power save feature of a conventional computer system and will generally not include turning the computer system off, though that would typically be an end user option. However, it is preferred that by powering down, the computer processor 12 will terminate a signal to a monitor 13 or will replace the video signal with a screen saver so that the user screen is not readily visible. Also, powering down will include the shutting off of non-essential computer components to save on electricity. Ideally, the shut down system 10 will be primarily used as an input to the computer processor 12 to instruct the processor 12 to initiate power saving and user identity software. This shall be explained in further detail below.

The system primarily includes a sitting detection assembly 14 that is mounted in a seat cushion 15. The seat cushion 15 may be any conventional seat cushion, preferably for a desk chair, and it is envisioned that the seat cushion of a desk chair may be constructed having the sitting detection assembly 14 mounted therein. The sitting detection assembly 14 includes a pressure indicator 16 for detecting a weight greater than ten pounds if it is positioned on the seat cushion 15. A transmitter 17 is operationally coupled to the pressure indicator 16. The transmitter 17 is adapted for sending a wireless signal when the pressure indicator 16 detects the weight. The transmitter 17 may also be adapted for sending a first wireless signal when the pressure indicator 16 detects the weight and a second wireless signal when the pressure indicator 16 does not detect the weight, or when the weight is removed. A receiver 18 for receiving the first and second wireless signals is electrically coupled to the computer processor 12 such that the receiver 18 may relay the first and second wireless signals to the computer processor 12. The computer processor 12 may selectively power down or power up the computer system depending on the programming being utilized by the processor. A power supply 19 is electrically coupled to the pressure indicator and to the transmitter. The power supply 19 is preferably a rechargeable battery.

It is presumed that the programming will also be used for security purposes. In this regard, when a user of the computer system 11 removes their weight from the seat cushion 15, the second wireless signal is transmitted to the computer processor 12. The processor 12 initiates sleep mode and any security restrictions, such as passwords or biometric inputs, such that another person subsequently sitting on the cushion would require the password. The processor 12 would preferably delay the initiation of the sleep mode for at least one minute to allow for short periods away from the desk. The first wireless signal is sent to the processor 12 when a person again sits on the cushion 15. This powers up the computer 11 again so that the user may insert the password or otherwise provide the required information for the security restrictions. The transmitter may also continuously, or intermittently, send a signal with information as to the status of the pressure indicator.

Additionally, it is preferred that the system also utilizes a motion detector 20 for detecting the movement of a person. The motion detector 20 is electrically coupled to the computer processor 12. The motion detector 20 preferably comprises an infrared motion detector that is mounted within the monitor 13 of the computer system. The computer processor 12 may selectively power down the computer system 11 when the motion detector 20 does not detect motion.

The motion detector 20 may be used in conjunction with the pressure indicator 16 such that the processor 12 will not power down the computer system 11 if the motion detector 20 continuously detects motion after the weight has been removed from the seat cushion 15. Alternatively, if the transmitter 17 only sends one signal, the motion detector 20 may be used to verify if the computer user is still positioned adjacent to the computer system 11 or if that person has moved away from the computer system 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automatic computer shut off input system for detecting the presence of a user and sending a signal to a computer processor of a computer system to selectively power down or power up the computer, said shut off system comprising:
   a sitting detection assembly being mounted in a seat cushion, said sitting detection assembly including;
      a pressure indicator for detecting a weight being positioned on the seat cushion;
      a transmitter being operationally coupled to said pressure indicator, said transmitter being adapted for sending a wireless signal when said pressure indicator detects the weight; and
      a receiver for receiving said wireless signal being electrically coupled to the computer processor such that said receiver may relay said wireless signal to the computer processor, wherein said computer processor may selectively power down or power up the computer system.

2. The automatic computer shut off system of claim 1, further including a motion detector for detecting the movement of a person, said motion detector being electrically coupled to the computer processor, wherein said computer processor may selectively power down the computer system when said motion detector does not detect motion.

3. An automatic computer shut off input system for detecting the presence of a user and sending a signal to a computer processor of a computer system to selectively power down or power up the computer, said shut off system comprising:
   a sitting detection assembly being mounted in a seat cushion, said sitting detection assembly including;
      a pressure indicator for detecting a weight greater than ten pounds being positioned on the seat cushion;
      a transmitter being operationally coupled to said pressure indicator, said transmitter being adapted for sending a first wireless signal when said pressure indicator detects the weight and a second wireless signal when said pressure indicator does not detect the weight;
      a receiver for receiving said first and second wireless signals being electrically coupled to the computer processor such that said receiver may relay said first and second wireless signals to the computer processor, wherein said computer processor may selectively power down or power up the computer system; and
   a motion detector for detecting the movement of a person, said motion detector being electrically coupled to the computer processor, wherein said computer processor may selectively power down the computer system when said motion detector does not detect motion, said motion detector comprising an infrared motion detector.

* * * * *